(12) United States Patent
Frenger et al.

(10) Patent No.: US 11,564,188 B2
(45) Date of Patent: Jan. 24, 2023

(54) DISTRIBUTED MIMO SYNCHRONIZATION

(71) Applicant: Telefonaktiebolaget LM Ericsson (publ), Stockholm (SE)

(72) Inventors: Pål Frenger, Linköping (SE); Emil Björnson, Linköping (SE); Erik Larsson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/649,768

(22) PCT Filed: Aug. 15, 2018

(86) PCT No.: PCT/EP2018/072130
§ 371 (c)(1),
(2) Date: Mar. 23, 2020

(87) PCT Pub. No.: WO2019/076513
PCT Pub. Date: Apr. 25, 2019

(65) Prior Publication Data
US 2020/0322907 A1   Oct. 8, 2020

Related U.S. Application Data

(60) Provisional application No. 62/573,280, filed on Oct. 17, 2017.

(51) Int. Cl.
*H04W 56/00* (2009.01)
*H04B 7/024* (2017.01)
(52) U.S. Cl.
CPC .......... *H04W 56/002* (2013.01); *H04B 7/024* (2013.01)
(58) Field of Classification Search
CPC ................................ H04W 56/002; H04B 7/024
See application file for complete search history.

(56) References Cited

U.S. PATENT DOCUMENTS

| 4,812,855 A | 3/1989 | Coe et al. |
| 6,054,960 A | 4/2000 | Tolson et al. |

(Continued)

FOREIGN PATENT DOCUMENTS

| CN | 101449190 A | 6/2009 |
| CN | 102685673 A | 9/2012 |

(Continued)

OTHER PUBLICATIONS

Narevsky, Nathan, et al., "eWallpaper Burst-Mode Serial Link", BWRC Summer Retreat, May 18-20, 2014, 1 page.

(Continued)

*Primary Examiner* — Huy D Vu
*Assistant Examiner* — Bailor C Hsu
(74) *Attorney, Agent, or Firm* — Murphy, Bilak & Homiller, PLLC

(57) ABSTRACT

A method of operating a distributed MIMO system is disclosed. The distributed MIMO system is configured to serve a plurality of wireless communication devices ($u_1, \ldots, u_N$). The distributed MIMO system comprises a number of access points ($A_1, \ldots, A_K$), each comprising a time circuit (180) configured to keep track of a local time of the access point ($A_1, \ldots, A_K$). The method comprises performing (210) an intra-group synchronization procedure for a group ($G_1$) of at least three access points ($A_1$-$A_3$). The intra-group synchronization procedure comprises, for each access point ($A_i$) in the group ($G_1$), transmitting ($T_i$), from that access point ($A_i$), a synchronization signal and obtaining ($O_i$) a transmission time indicator indicating a transmission time of that synchronization signal in the local time of that access point ($A_i$). Furthermore, the intra-group synchronization procedure comprises receiving ($R_{im}, R_{in}$), by each of the other access points ($A_m, A_n$) in the group, the synchronization signal and obtaining ($O_{im}, O_{in}$) reception time (Continued)

indicators indicating reception times, in the local times of the other access points ($A_m$, $A_n$), when the synchronization signal was received by the other access points ($A_m$, $A_n$) in the group.

12 Claims, 4 Drawing Sheets

(56) References Cited

U.S. PATENT DOCUMENTS

| | | |
|---|---|---|
| 6,362,906 B1 | 3/2002 | O'Shea |
| 6,950,414 B1 | 9/2005 | Grohn et al. |
| 6,975,877 B1* | 12/2005 | Dergun ............... H04J 3/0652 455/524 |
| 7,372,424 B2 | 5/2008 | Mohuchy et al. |
| 8,203,483 B2 | 6/2012 | Richards |
| 8,344,949 B2* | 1/2013 | Moshfeghi ............ G01S 5/0289 342/457 |
| 8,472,767 B2 | 6/2013 | Easton et al. |
| 1,246,229 A1 | 1/2016 | Asplund et al. |
| 9,806,818 B2 | 10/2017 | Henry et al. |
| 9,960,849 B1 | 5/2018 | Dogiamis et al. |
| 10,051,587 B2* | 8/2018 | Jayaraman ............ H04W 24/02 |
| 10,079,668 B2 | 9/2018 | Dogiamis et al. |
| 10,231,130 B2 | 3/2019 | Sunay et al. |
| 2001/0045915 A1 | 11/2001 | Moren |
| 2002/0172176 A1 | 11/2002 | Moss |
| 2004/0096222 A1 | 5/2004 | Cagenius |
| 2006/0209670 A1 | 9/2006 | Gorokhov et al. |
| 2007/0081557 A1 | 4/2007 | Binetti et al. |
| 2007/0269170 A1 | 11/2007 | Easton et al. |
| 2008/0204330 A1 | 8/2008 | Hsiao et al. |
| 2008/0318614 A1 | 12/2008 | Iizuka et al. |
| 2009/0122782 A1* | 5/2009 | Horn .................. H04J 3/0679 370/350 |
| 2009/0147768 A1* | 6/2009 | Ji ...................... H04J 3/06 370/350 |
| 2010/0067515 A1* | 3/2010 | Chin .................. H04W 56/002 370/350 |
| 2010/0067588 A1 | 3/2010 | Takano |
| 2010/0208777 A1 | 8/2010 | Ogaz |
| 2010/0238917 A1* | 9/2010 | Silverman ............ H04J 3/0667 375/354 |
| 2011/0200325 A1 | 8/2011 | Kobyakov et al. |
| 2011/0216660 A1* | 9/2011 | Lee .................. H04W 56/0015 370/252 |
| 2011/0263271 A1 | 10/2011 | Hoymann et al. |
| 2012/0027361 A1 | 2/2012 | Brower et al. |
| 2012/0120874 A1* | 5/2012 | McLaughlin ....... H04W 56/002 370/328 |
| 2012/0315938 A1 | 12/2012 | Van et al. |
| 2013/0272202 A1 | 10/2013 | Lee et al. |
| 2013/0272696 A1 | 10/2013 | Webb et al. |
| 2013/0285879 A1 | 10/2013 | Wheeler |
| 2013/0301635 A1* | 11/2013 | Hollabaugh ...... H04W 56/0035 370/350 |
| 2014/0029689 A1 | 1/2014 | Liu et al. |
| 2014/0037294 A1 | 2/2014 | Cox et al. |
| 2014/0132477 A1 | 5/2014 | Chan et al. |
| 2014/0211779 A1* | 7/2014 | Caire .................... H04W 56/00 370/350 |
| 2014/0269645 A1* | 9/2014 | Do ................... H04W 56/0065 370/338 |
| 2014/0362840 A1* | 12/2014 | Wong .................... H04W 72/12 370/338 |
| 2015/0003261 A1 | 1/2015 | Silverman et al. |
| 2015/0131528 A1* | 5/2015 | Abraham .......... H04W 56/0015 370/328 |
| 2015/0162751 A1 | 6/2015 | Leabman et al. |
| 2015/0372744 A1 | 12/2015 | Lehtinen |
| 2016/0112263 A1 | 4/2016 | Henry et al. |
| 2016/0277160 A1 | 9/2016 | Lim et al. |
| 2016/0323925 A1* | 11/2016 | Alanen ................. H04W 8/005 |
| 2016/0360533 A1 | 12/2016 | Bennett et al. |
| 2017/0195109 A1 | 7/2017 | Perez-Cruz et al. |
| 2017/0195140 A1 | 7/2017 | Yi et al. |
| 2017/0271745 A1 | 9/2017 | Yun et al. |
| 2017/0279515 A1 | 9/2017 | Wu et al. |
| 2017/0295550 A1* | 10/2017 | Amizur ............... H04W 56/001 |
| 2018/0041980 A1* | 2/2018 | Virginas ............ H04W 56/0065 |
| 2018/0109392 A1 | 4/2018 | Gerszberg et al. |
| 2018/0152226 A1 | 5/2018 | Li et al. |
| 2018/0287696 A1 | 10/2018 | Barbieri et al. |
| 2019/0097724 A1 | 3/2019 | Ye et al. |
| 2019/0141651 A1* | 5/2019 | Venkatachalam Jayaraman ......... H04W 56/0005 |
| 2019/0229821 A1 | 7/2019 | Liu |
| 2019/0260459 A1 | 8/2019 | Jeon et al. |
| 2019/0261202 A1 | 8/2019 | Tang et al. |
| 2019/0363763 A1 | 11/2019 | Frenger et al. |

FOREIGN PATENT DOCUMENTS

| | | |
|---|---|---|
| CN | 102754365 A | 10/2012 |
| CN | 103222108 A | 7/2013 |
| CN | 108418614 A | 8/2018 |
| EP | 0667068 A1 | 8/1995 |
| EP | 0830754 A1 | 3/1998 |
| EP | 1798898 A1 | 6/2007 |
| EP | 2061173 A1 | 5/2009 |
| EP | 2214261 A1 | 8/2010 |
| EP | 2515374 A2 | 10/2012 |
| EP | 2629363 A1 | 8/2013 |
| EP | 2999155 A1 | 3/2016 |
| JP | 2004503991 A | 2/2004 |
| JP | 2008182733 A | 8/2008 |
| JP | 2009527145 A | 7/2009 |
| JP | 2009537964 A | 10/2009 |
| JP | 2014017678 A | 1/2014 |
| JP | 2018182660 A | 11/2018 |
| KR | 20190098693 A | 8/2019 |
| TW | 201541891 A | 11/2015 |
| WO | 9506365 A1 | 3/1995 |
| WO | 9641430 A1 | 12/1996 |
| WO | 0007307 A2 | 2/2000 |
| WO | 0197465 A1 | 12/2001 |
| WO | 2007142805 A2 | 12/2007 |
| WO | 2010086173 A1 | 8/2010 |
| WO | 2016039842 A1 | 3/2016 |
| WO | 2016115546 A1 | 7/2016 |
| WO | 2018081271 A1 | 5/2018 |
| WO | 2018103897 A1 | 6/2018 |
| WO | 2019053475 A1 | 3/2019 |
| WO | 2019053745 A1 | 3/2019 |
| WO | 2019101290 A1 | 5/2019 |
| WO | 2019152793 A1 | 8/2019 |
| WO | 2018103897 A9 | 10/2019 |
| WO | 2019240808 A1 | 12/2019 |

OTHER PUBLICATIONS

Preuss, Robert D., et al., "Two-Way Synchronization for Coordinated Multicell Retrodirective Downlink Beamforming", IEEE Transactions on Signal Processing, vol. 59, No. 11, Nov. 2011, pp. 1-13.
Puglielli, Antonio, et al., "Design of Energy- and Cost-Efficient Massive MIMO Arrays", Proceedings of the IEEE, vol. 104, No. 3, Mar. 2016, pp. 1-21.
Zhang, Yuxian, et al., "Measurement and Evaluations of Coherent Joint Transmission for 5G Networks", 2017 IEEE Vehicular Technology Conference (VTC Spring), Jun. 4, 2017, pp. 1-5.
"3GPP TS 38.104 V17.0.0", 3rd Generation Partnership Project; Technical Specification Group Radio Access Network; NR; Base Station (BS) radio transmission and reception (Release 17), Dec. 2020, pp. 1-295.
"3GPP TR 38.874 V.16.0.0", 3rd Generation Partnership Project; Technical Specification Group Radio Access Network; NR; Study on Integrated Access and Backhaul; (Release 16), Dec. 2018, pp. 1-111.

(56) References Cited

OTHER PUBLICATIONS

Dahlman, Erik, et al., "5G NR The Next Generation Wireless Access Technology", Academic Press, Elsevier Ltd., 2018, pp. 1-469.

Interdonato, Giovanni, "Signal Processing Aspects of Cell-Free Massive MIMO", Linköping Studies in Science and Technology Licentiate Thesis No. 1817, 2018, pp. 1-49.

Interdonato, Giovanni, el al., "Ubiquitous Cell-Free Massive MIMO Communications", arXiv:1804.03421v4 [cs.IT], Sep. 6, 2019, pp. 1-13.

IEEE Computer Society, "IEEE Std 802.3-2018, Section 4", IEEE Standard for Ethernet, Revision of IEEE Std 302.3-2015, IEEE New York, NY, Jun. 14, 2018, pp. 1-909.

Interdonato, Giovanni, "Signal Processing Aspects of Cell-Free Massive MIMO", Linköping Studies in Science and Technology Licentiate Thesis No. 1817, Licentiate Thesis, Linkoping University, Sep. 21, 2018, pp. 1-49.

Interdonato, Giovanni, et al., "Ubiquitous Cell-Free Massive MIMO Communications", https://arxiv.org/abs/1804.03421, 2018, pp. 1-13.

Vieira, Joao, et al., "A receive/transmit calibration technique based on mutual coupling for massive MIMO base stations", 2016 IEEE 27th Annual IEEE International Symposium on Personal, Indoor and Mobile Radio Communications—(PIMRC): Fundamentals and PHY, 2016, pp. 1-6.

Vieira, Joao, et al., "Reciprocity Calibration for Massive MIMO: Proposal, Modeling and Validation", IEEE Transactions on Wireless Communications, vol. 16, Issue 5, May 2017, pp. 1-15.

Westra, Jan R., et al., "A Sub-1.75W Full-Duplex 10GBASE-T Transceiver in 40nm CMOS", 2014 IEEE International Solid-State Circuits Conference, Session 8, Optical Links and Copper PHYs, 8.5, Feb. 11, 2014, pp. 146-148.

\* cited by examiner

DISTRIBUTED MIMO SYNCHRONIZATION

TECHNICAL FIELD

The present disclosure relates to distributed MIMO (Multiple Input Multiple Output) systems, such as distributed massive MIMO systems.

BACKGROUND

As cellular networks are densified, the inter-cell interference become a major issue and the topology of the network may have to be changed; a conventional cellular architecture with co-located antennas is not necessarily optimal. Cell-free massive MIMO (also known as "distributed antenna system" or "distributed massive MIMO") technology can be applied to this situation. In such a system, many physically separated access points can be deployed within a conventional cell and there might be no explicit cell boundaries. Each user is served by phase-coherent transmission from a subset of such access points, typically the ones that provide a sufficiently high SNR to the user.

SUMMARY

In a traditional MIMO system, with antenna elements physically confined to a localized antenna array, it is relatively straightforward to control transmissions from the different antenna elements to be coherent in phase. The inventors have realized that, in a distributed MIMO system, such as a distributed massive MIMO system, on the other hand, timing errors between transmissions from different access points to a given wireless communication device may deteriorate the degree of coherence and thereby the obtainable throughput. Aspects of the present disclosure relate to synchronization procedures that can facilitate phase-coherent transmissions in a distributed MIMO system.

According to a first aspect, there is provided a method of operating a distributed MIMO system, such as a distribute massive MIMO system. The distributed MIMO system is configured to serve a plurality of wireless communication devices. The distributed MIMO system comprises a number of access points, each comprising a time circuit configured to keep track of a local time of the access point. The method comprises performing an intra-group synchronization procedure for a group of at least three access points. The intra-group synchronization procedure comprises, for each access point in the group, transmitting, from that access point, a synchronization signal and obtaining a transmission time indicator indicating a transmission time of that synchronization signal in the local time of that access point. Furthermore, the intra-group synchronization procedure comprises receiving, by each of the other access points in the group, the synchronization signal and obtaining reception time indicators indicating reception times, in the local times of the other access points, when the synchronization signal was received by the other access points in the group.

The intra-group synchronization procedure may comprise obtaining, based on the obtained transmission time indicators and reception time indicators, timing adjustment parameters for counteracting time differences between the local times of the access points in the group.

The method may comprise performing the intra-group synchronization procedure for each of a plurality of groups of at least three access points. The method may further comprise performing an inter-group synchronization procedure for the plurality of groups.

The inter-group synchronization procedure may comprise transmitting, from a first group, a synchronization signal and obtaining a transmission time indicator indicating a transmission time of that synchronization signal in a local time of the first group. The inter-group synchronization procedure may further comprise receiving, by a second group, the synchronization signal and obtaining a reception time indicator indicating a reception time, in a local time of the second group, when the synchronization signal was received by the second group.

In some embodiments, the inter-group synchronization procedure comprises obtaining, based on the obtained transmission time indicator and reception time indicator, a timing adjustment parameter for counteracting time differences between the local times of the first and the second group.

The method may comprise transmitting, from a plurality of the access points, a signal to a wireless communication device served by the distributed MIMO system. The mutual timing of the transmissions of the signal from the individual access points of the plurality of access points may be controlled based on the above-mentioned timing adjustment parameters.

According to a second aspect, there is provided a distributed MIMO system. The distributed MIMO system comprises a plurality of access points, each comprising a time circuit configured to keep track of a local time of the access point. Furthermore, the distributed MIMO system comprises a control circuit configured to control the MIMO system to perform the method of the first aspect.

According to a third aspect, there is provided a computer program product comprising computer program code for performing the method of the first aspect when said computer program code is executed by a programmable control circuit of the distributed MIMO system.

According to a fourth aspect, there is provided a computer readable medium, such as a non-transitory computer-readable medium, storing a computer program product comprising computer program code for performing the method of the first aspect when said computer program code is executed by a programmable control circuit of the distributed MIMO system.

DETAILED DESCRIPTION

The term "access point" is used in this disclosure. Sometimes, "antenna" or "antenna element" is used in the field of MIMO transmissions with the same meaning as the term "access point" has in this disclosure.

In a traditional MIMO system, with antenna elements physically confined to a localized antenna array, it is relatively straightforward to control transmissions from the different antenna elements to be coherent in phase. In a distributed MIMO system, such as a distributed massive MIMO system, on the other hand, timing errors between transmissions from different access points to a given wireless communication device can reduce the degree of coherence and, consequently, the obtainable throughput and/or data rate. Due to the physical distance between the different access points, as opposed to the relatively closely spaced antenna elements in an antenna array, the access points typically cannot operate with a common time reference, but will typically each have their own local time reference (or "clock"). Differences between local times in the different access points give rise to the timing errors mentioned above. For example, if a number of access points are to be transmitting a coordinated transmission at time t=0, but their local time references are slightly unsynchronized, they will start transmitting at slightly different times, which can reduce the degree of coherence in the coordinated transmission. This disclosure relates to methods and apparatuses that can alleviate such problems to enable and/or facilitate coherent transmission among widely spaced access points.

Figure 1:
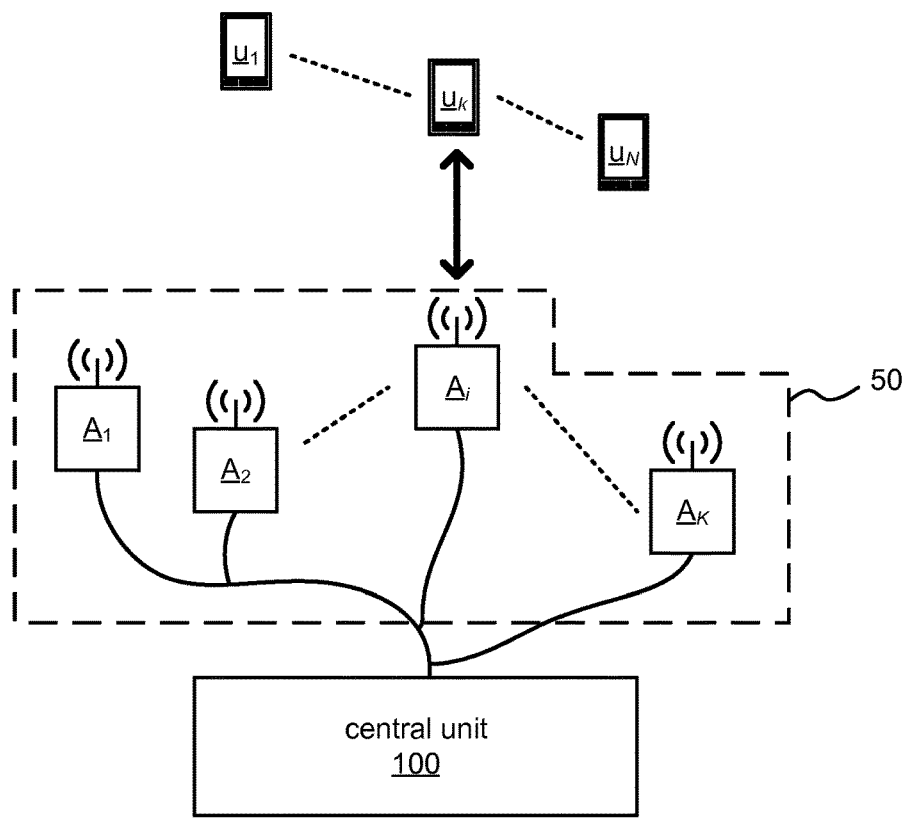
FIGS. 1-2 illustrate exemplary distributed MIMO systems according to exemplary embodiments of the present disclosure.

FIG. 1 is a block diagram of a distributed MIMO system according to an exemplary embodiment. The system comprises a plurality of access points $A_1, \ldots, A_K$ that form a cluster 50 of access points. The distributed MIMO system further comprises a central unit 100. The central unit 100 can provide backhaul and implement functionalities in higher layer protocols (TCP/IP, PDCP, RLC, MAC), and can also perform a large part of the base-band physical layer processing such as channel coding and decoding, modulation, etc. The central unit 100 can also coordinate calculations that are performed relatively seldom; such as determining which access points that should serve which users; ensure that the nodes are properly calibrated; assign pilots to users to be used for channel estimation; make handover decisions to other central units in the vicinity; etc.

In the example shown in FIG. 1, the distributed MIMO system can serve a number N of wireless communication devices (or "wireless devices" for short) $u_1, \ldots, u_N$. Examples of such wireless device include what is generally referred to as a user equipment (UE). The wireless devices $u_1, \ldots, u_N$ are depicted in FIG. 1 as mobile phones, but can be any kind of devices with cellular communication capabilities, such as a tablet or laptop computers, machine-type communication (MTC) devices, or similar.

In such a distributed MIMO system, communication between wireless device $u_k$ and the distributed MIMO system may take place as outlined in the following. First, the wireless device $u_k$ transmits a pilot signal. Each of the access points $A_1-A_K$ that receives the pilot signal can utilize it to estimate a channel between itself and the wireless device $u_k$. Let $g_{k,m}$ denote the estimated channel between the wireless device $u_k$ and the access point $A_m$. The access points $A_1-A_K$ can then, jointly, send a signal $s_k$ to the wireless device $u_k$ using so-called conjugate beamforming, where the signal sent from the access point $A_m$ is $g^*_{k,m}s_k$, where $g^*_{k,m}$ denotes the complex conjugate of $g_{k,m}$. Conjugate beamforming is, per se, well known to those skilled in the relevant art and not further discussed herein. Notably, the scheme described above can facilitate a relatively large portion of the required signal processing to be performed locally in the access points $A_1-A_K$, since each access point $A_m$ can estimate the channel $g_{k,m}$ and derive its conjugate $g^*_{k,m}$ independently. It should be noted that, in some exemplary embodiments, only a subset of the access points $A_1-A_K$ are involved in the joint transmission to the wireless device $u_k$. For instance, in some exemplary embodiments, only the access points for which the SNR (signal-to-noise ratio) or SINR (signal-to-interference-and-noise ratio) between the access point and the wireless device $u_k$ exceeds a threshold are involved in said joint transmission. If the estimated channels $g_{k,m}$ exactly corresponds to the actual channel, the combined signal received at the wireless device is s $\Sigma_m | g_{k,m}|$, where the summation is made over the indices m corresponding to the access points $A_m$ that are involved in the joint transmission.

In order to avoid degradation of the joint transmissions from the access points $A_1-A_K$, it is desirable the there is a relatively high degree of coherence between the individual transmissions from the different access points $A_1-A_N$. In order to accomplish this, some exemplary embodiments of the present disclosure can include techniques for synchronizing the access points $A_1, \ldots, A_K$, or subsets thereof, in time.

Figure 2:
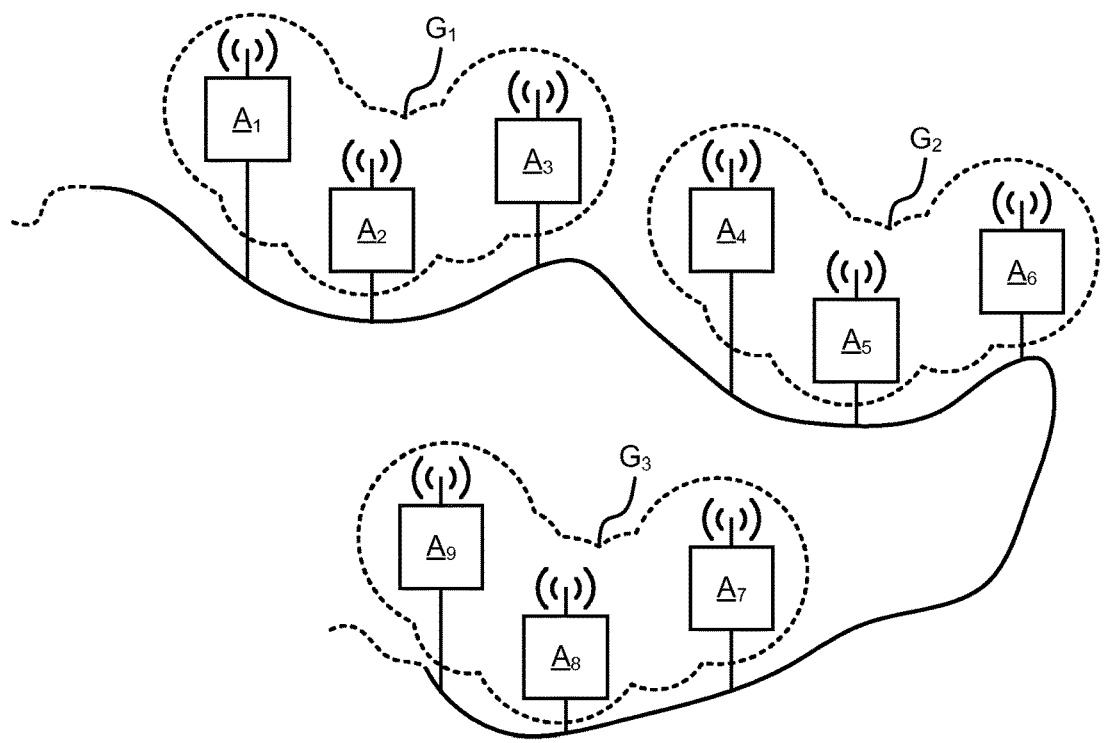

FIG. 2 illustrates an exemplary arrangement of how access points $A_i$ can be grouped into groups $G_j$ of at least three access points. In FIG. 2, the groups $G_j$ are illustrated as disjoint. However, in other exemplary embodiments, one or more access points $A_i$ can belong to more than one group. Furthermore, in FIG. 2, each group $G_j$ has exactly three access points $A_i$. However, in some exemplary embodiments, some or all groups $G_j$ can have more than three access points $A_i$. In FIG. 2, access points $A_1-A_3$ belong to group $G_1$, access points $A_4-A_6$ belong to group $G_2$, and access points $A_7-A_9$ belong to group $G_3$.

Due to the physical distribution of the access points over a relatively large area, it may not be feasible to only rely on a central clock (e.g. in the central unit 100) keeping track of a central time of the distributed MIMO system for timing of events, such as transmissions. According to embodiments of the present disclosure, each access point $A_i$ can comprise a time circuit configured to keep track of a local time of the access point $A_i$. This local time can be used in each access point $A_i$ for timing events, such as transmissions, from the access point.

Figure 3:
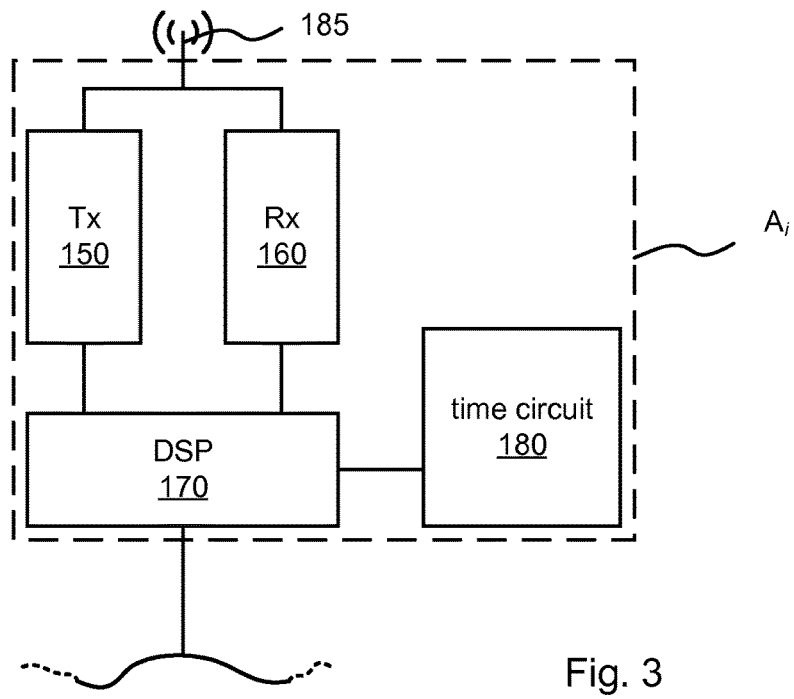
FIG. 3 is a block diagram of an exemplary access point according to exemplary embodiments of the present disclosure.

FIG. 3 is a block diagram of an access point $A_i$ according to some exemplary embodiments. The exemplary access point comprises the above-mentioned time circuit labeled with the reference number 180. The exemplary access point can also comprise a transmitter (Tx) circuit 150 and a receiver (Rx) circuit 160. In FIG. 3, the Tx circuit 150 and the Rx circuit 160 are shown as connected to a common antenna 185. The Tx circuit 150 can comprise a digital-to-analog converter (DAC) for converting a signal to be transmitted from a digital to an analog representation. It may also comprise one or more mixers, filters, power amplifiers, etc. to transform the signal to be transmitted to a physical signal suitable to drive the antenna 185. The design of Tx circuits is, per se, well known to persons skilled in the relevant art and not discussed herein in any further detail. The Rx circuit 160 can comprise an analog-to-digital converter (ADC) for converting received signal from an analog to a digital representation. It can also comprise one or more mixers, filters, low-noise amplifiers (LNAs), etc. to transform a signal received at the antenna 185 to a physical signal suitable to be input to said ADC. The design of Rx circuits is, per se, well known to persons skilled in the relevant art and not discussed herein in any further detail.

In FIG. 3, the exemplary access point $A_i$ also comprises a digital signal processing (DSP) circuit 170. The DSP circuit 170 can be configured to perform conjugate beamforming processing operations locally in the access point $A_i$, on signals to be transmitted via the Tx circuit 150 and/or on signals received via the Rx circuit 160. It can also be configured to derive channel estimates $g_{k,i}$ of the channels between the access point $A_i$ and wireless devices $u_k$.

In the following, a mathematical basis for embodiments of the disclosure is presented. Reference is made to the group $G_1$ (FIG. 2), but applies to any group $G_j$. Some exemplary embodiments comprise an intra-group synchronization procedure that synchronizes the access points within one of the groups (such as the access points $A_1$-$A_3$ within the group $G_1$, etc.) with each other.

In FIG. 3, it is assumed that an absolute, or central, time (or phase) reference is maintained centrally, but the access points $A_1$-$A_3$ are unsynchronized they do not have access to this time reference. The central time reference can be maintained by the central unit 100. In addition, in FIG. 3 it is also assumed that the Tx circuit 150 and the Rx circuit 160 in each access point $A_i$ are unsynchronized. This means that effectively, the Tx circuit 150 and Rx circuit 160 of each access point $A_i$ have their own local time references. For instance, the time circuit 180 can keep track of separate local times for the Tx circuit 150 and the Rx circuit 180. Although the time circuit is described as being configured to keep track of a local time, in some exemplary embodiments the time circuit 180 can keep track of more than one local time, e.g. a separate local time for the Tx circuit 150 and a separate local time for the Rx circuit 160. Alternatively, the local time can be viewed as a vector quantity, or tuple, having separate scalar components representing a separate local times for the Tx circuit 150 and the Rx circuit 160). Alternatively, the time circuit 180 can keep track of a common local time for the Tx circuit 150 and the Rx circuit 160, but these can nevertheless be unsynchronized due to factors such as signal propagation delays within the Tx circuit 150 and Rx circuit 160, and there may thus effectively be different local times for the Tx circuit 150 and the Rx circuit 160 also in this case.

In any case, the difference in time reference between the Tx circuit 150 and Rx circuit 160 in a given access point $A_i$ represents a (uplink-downlink) reciprocity calibration error. The difference in, e.g., Tx circuit time reference between any pair of access points represents a synchronization error between these two access point. A priori, all reciprocity and synchronization errors are assumed to be unknown.

In the discussion below, the Tx circuit 150 of access point $A_i$ has a clock bias of $t_i$ from central time, i.e., its local time is zero at central time $t_i$. The receiver of access point $A_i$ has a clock bias of $r_i$ from central time, i.e., its local time is zero at central time $r_i$.

If the access point $A_i$ transmits a known pulse, below referred to also as a synchronization signal, at its local time zero, this pulse will in central time be transmitted at time $t_1$ (per definition). The (Rx circuit 160 of the) access point $A_2$ will receive the pulse at time $\delta_{12}=t_1-r_2$ in its local time. Similarly, the (Rx circuit 160 of the) access point $A_3$ will receive the pulse at time $\delta_{13}=t_1-r_3$ in its local time.

Furthermore, if the access point $A_2$ transmits the pulse at its local time zero, this pulse will in central time be transmitted at time $t_2$ (again, per definition). The (Rx circuit 160 of the) access point $A_1$ will receive the pulse at time $\delta_{21}=t_2-r_1$ in its local time. Similarly, the (Rx circuit 160 of the) access point $A_3$ will receive the pulse at time $\delta_{23}=t_2-r_3$ in its local time.

Moreover, if the access point $A_3$ transmits the pulse at its local time zero, this pulse will in central time be transmitted at time $t_3$ (again, per definition). The (Rx circuit 160 of the) access point $A_1$ will receive the pulse at time $\delta_{31}=t_3-r_1$ in its local time. Similarly, the (Rx circuit 160 of the) access point $A_2$ will receive the pulse at time $\delta_{32}=t_3-r_2$ in its local time.

Thus, by transmitting synchronization signals at known time instants (in local time) from each of the access points $A_1$-$A_3$, and listening for these synchronization signals in the other access points $A_1$-$A_3$, it is possible to measure the parameters $\delta_{ij}=t_i-r_j$. It should be noted that local time zero was used above for transmission merely as an example. If access point $A_i$ instead transmits the pulse at local time $\tau_i$, the (Rx circuit 160 of the) access point $A_j$ will receive the pulse at time $\delta_{ij}+\tau_i$ (in its local time), and $\delta_{ij}$ can be obtained by simply subtracting $\tau_i$ from this value.

The following exemplary linear equation system can be used to describe the relationship between the different $\delta_{ij}$, and the different $t_i$ and $r_i$ $$\begin{bmatrix} \delta_{12} \\ \delta_{13} \\ \delta_{21} \\ \delta_{23} \\ \delta_{31} \\ \delta_{32} \end{bmatrix} = \begin{bmatrix} 1 & 0 & 0 & 0 & -1 & 0 \\ 1 & 0 & 0 & 0 & 0 & -1 \\ 0 & 1 & 0 & -1 & 0 & 0 \\ 0 & 1 & 0 & 0 & 0 & -1 \\ 0 & 0 & 1 & -1 & 0 & 0 \\ 0 & 0 & 1 & 0 & -1 & 0 \end{bmatrix} \begin{bmatrix} t_1 \\ t_2 \\ t_3 \\ r_1 \\ r_2 \\ r_3 \end{bmatrix}.$$

This system has six measurements (i.e., $\delta_{ij}$) and six unknown variables (i.e., $t_i$ and $r_i$). It is straightforward to show that the matrix is singular such that not all of the variables $t_1, r_1, t_2, r_2, t_3, r_3$ can be obtained from this system. However, the reciprocity errors $(t_i-r_i)$ and synchronization errors $(t_i-t_j, i \neq j)$ can be recovered as:

$$t_1-r_1=\delta_{12}+\delta_{31}-\delta_{32}$$

$$t_2-r_2=\delta_{21}+\delta_{32}-\delta_{31}$$

$$t_3-r_3=\delta_{31}+\delta_{23}-\delta_{21}$$

$$t_1-t_2=\delta_{13}-\delta_{23}$$

$$t_1-t_3=\delta_{12}-\delta_{32}$$

$$t_2-t_3=\delta_{21}-\delta_{31}$$

Alternative methods can be used to recover the reciprocity and synchronization errors from the measurements. For example, a least-squares solution, or similar, can instead be used. Such a solution can be more effective in the presence of a relatively high degree of measurement noise.

For a group with N nodes, there will be N (N−1) measurements and 2N unknown variables. If N≥3, the matrix in the linear system of equations has rank 2N−1, which is always one smaller than what is needed to obtain all the variables. In contrast, for N=2, there are 4 unknown parameters, but the matrix rank is 2 since there is only two measurements. Hence, one cannot resolve all the parameters, but for N≥3 one can obtain all variables except one.

More precisely, from the measurements one can obtain all variables up to a common bias term. $t_1, t_2, t_3$ can be written in terms of the bias of access point $A_1$ (denoted b for future use):

$$t_1=b,$$

$$t_2=b-(t_1-t_2),$$

$$t_3=b-(t_1-t_3)$$

Similar arguments are possible for groups of 4, 5, . . . access points.

Figure 4:
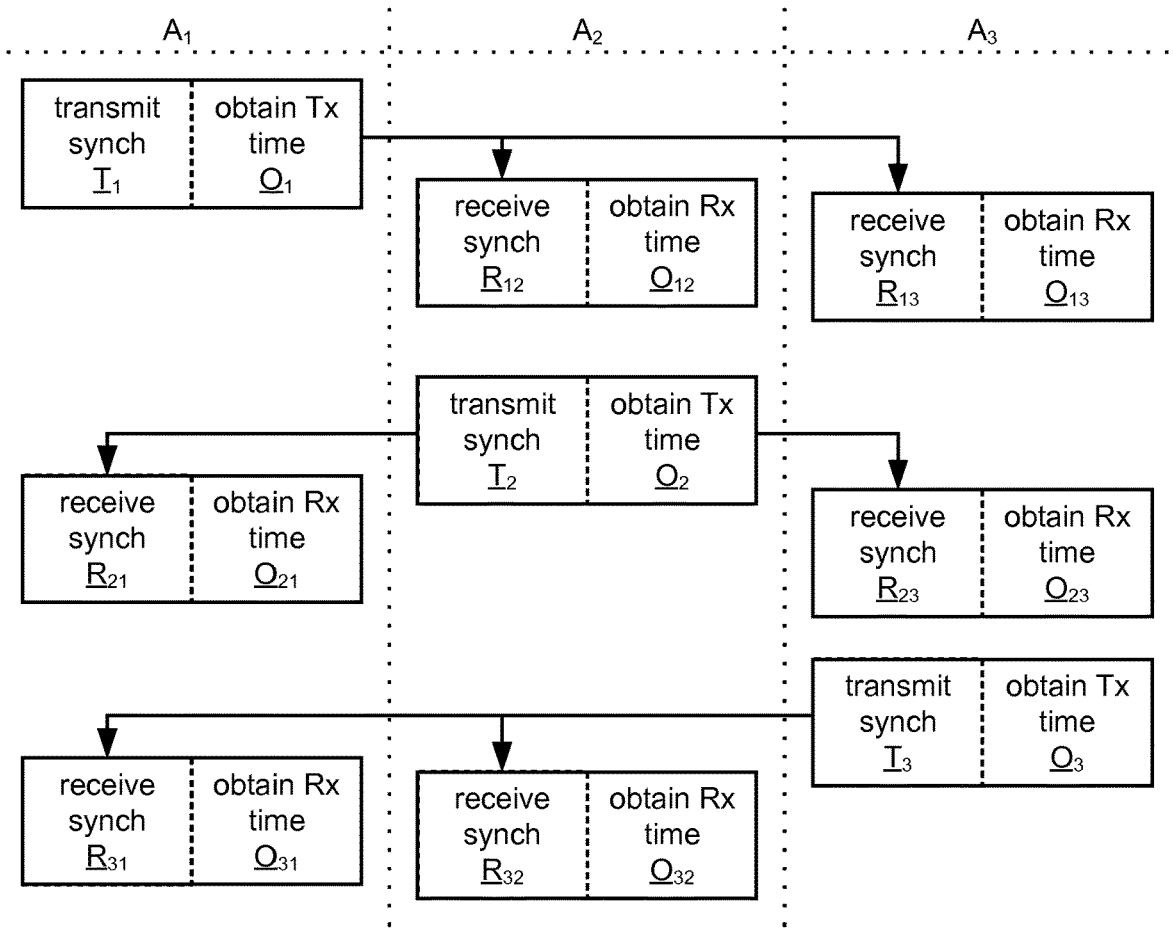
FIGS. 4-7 show flowcharts of exemplary methods and/or procedures according to exemplary embodiments of the present disclosure.

In line with the mathematical description above, some exemplary embodiments of the present disclosure comprise a method of operating the distributed MIMO system. The method comprises performing an intra-group synchronization procedure for the group $G_1$. The intra-group synchronization method and/or procedure, which is illustrated in FIG. 4 with a flow chart, comprises, for each access point $A_i$ in the group $G_1$:

transmitting, in step $T_i$, from that access point $A_i$, a synchronization signal.

obtaining, in step $O_i$, a transmission time indicator indicating a transmission time of that synchronization signal in the local time of that access point $A_i$.

receiving, in steps $R_{im}$, $R_{in}$, by each of the other access points $A_m$, $A_n$ in the group, the synchronization signal.

obtaining, in steps $O_{im}$, $O_{in}$, reception time indicators indicating reception times, in the local times of the other access points $A_m$, $A_n$, when the synchronization signal was received by the other access points $A_m$, $A_n$ in the group.

The transmissions steps $T_1$, $T_2$, and $T_3$ can be carried out in any order. For instance, step $T_1$ can be carried out first, then step $T_2$, then step $T_3$. However, any other order can be used as well.

In line with the mathematical description above, the transmission time indicators and reception time indicators can include sufficient information to enable determination of the reciprocity errors and the synchronization errors. Hence, the transmission time indicators and the reception time indicators can be used as a basis for obtaining timing adjustment parameters for counteracting time differences between the local times of the access points $A_1$-$A_3$ in the group $G_1$. The timing adjustment parameters can be numbers indicating said time differences, expressed in a suitable unit. Counteracting the time differences can be done in several different ways. One exemplary technique is to adjust the local times within the access points $A_1$-$A_3$ such that these are essentially the same. Another exemplary technique is to leave the local times as they are, but adjust the transmission times (in local times) of data transmissions from the access points $A_1$-$A_3$ such that these transmissions are coherent. Regardless of how the time differences are counteracted, the access points $A_1$-$A_3$ in the group $G_1$ can be considered to have a common local time after the intra-group synchronization procedure. Below, this is referred to as the local time of $G_1$. The local time of $G_1$ can be the local time that is kept track of by the time circuit 180 in one of the access points $A_1$-$A_3$. The bias of the local time of $G_1$ is referred to as $b_1$ below. That is, the local time of $G_1$ is zero at central time $b_1$.

According to some exemplary embodiments, the method of operating the distributed MIMO system comprises performing the intra-group synchronization procedure for each of a plurality of groups (such as $G_1$, $G_2$, $G_3$) of at least three access points (such as $A_1$-$A_3$, $A_4$-$A_6$, $A_7$-$A_9$).

Generalizing on the above discussion regarding a common local time of $G_1$, the access points $A_i$ in the group $G_j$ can be considered to have a common local time after the intra-group synchronization procedure. Below, this is referred to as the local time of $G_j$. The local time of $G_1$ can be the local time that is kept track of by the time circuit 180 in one of the access points $A_i$ in the group $G_j$. The bias of the local time of $G_J$ is referred to as $b_j$ below. That is, the local time of $G_j$ is zero at central time $b_j$.

Figure 5:
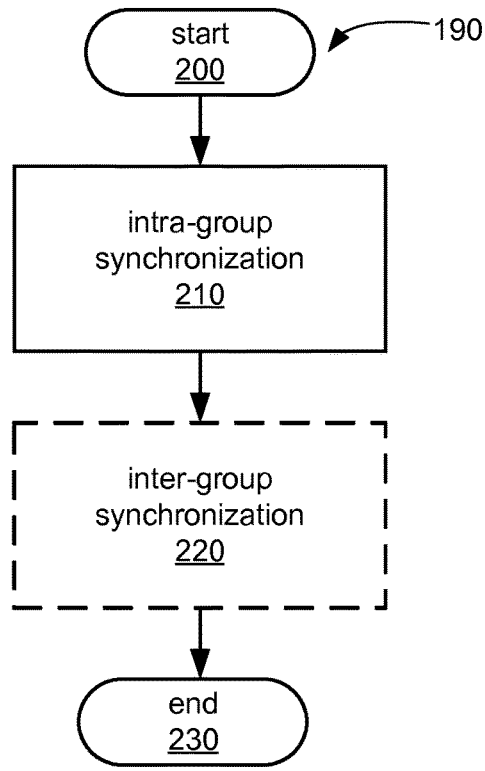

FIG. 5 shows a flowchart for an exemplary embodiment a synchronization procedure 190, which can be included in embodiments of the method and/or procedure of operating the distributed MIMO system. Operation of the synchronization procedure is started in step 200. In step 210, an intra-group synchronization procedure, e.g. as described above, is performed for one or more groups $G_j$. As illustrated in FIG. 5, some exemplary embodiments of the synchronization procedure can comprise performing an inter-group synchronization procedure in step 220, i.e., synchronizing the access points of two or more different groups.

Operation of the synchronization procedure is ended in step 230.

Figure 6:
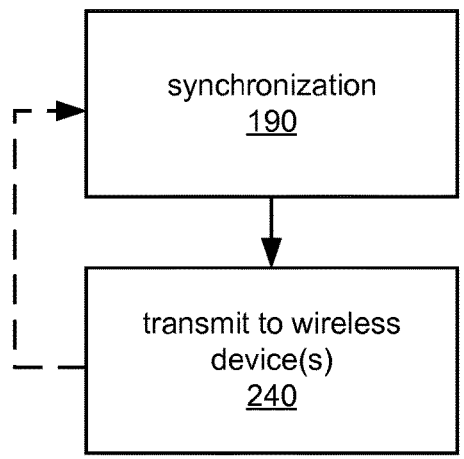

FIG. 6 is a flowchart of a method and/or procedure of operating the distributed MIMO system according to an exemplary embodiment. It includes the synchronization procedure 190 described above. As indicated in FIG. 6, the exemplary method and/or procedure can also comprise step 240 of transmitting, from a plurality of the access points $A_i$, a signal to a wireless communication device $u_k$ (or to multiple such communication devices) served by the distributed MIMO system. The mutual timing of the transmissions of the signal from the individual access points $A_i$ of the plurality of access points can be controlled based on timing adjustment parameters obtained in the synchronization procedure 190. Thereby, coherent transmission from the different access points $A_i$ is facilitated.

Exemplary embodiments of the inter-group synchronization step 220 are discussed below in some more detail. Consider first inter-group synchronization between group $G_1$ and group $G_2$. In this context, it is assumed that both group $G_1$ and group $G_2$ have been subject to intra-group synchronization. Thus, the reciprocity errors and synchronization errors within each of the groups are considered to be zero. As above, it is considered that the access points $A_1$-$A_3$ share a common local time, which is the local time of $G_1$. Similarly, it is considered that the access points $A_4$-$A_6$ share a common local time, which is the local time of $G_2$.

If the group $G_1$ transmits a known pulse, below referred to also as a synchronization signal, at its local time zero, this pulse will in central time be transmitted at time $b_1$ (per definition). The transmission from the group $G_1$ can be a transmission from any one of the access points $A_1$-$A_3$, or a coherent transmission from any combination of the access points $A_1$-$A_3$. The group $G_2$ will receive the pulse at time $d_{12}=b_1-b_2$ in its local time. The reception by the group $G_2$ can be a reception by any one of the access points $A_4$-$A_6$, or a coherent reception by any combination of the access points $A_4$-$A_6$. It should be noted that $d_{12}$ represents the synchronization error between group $G_1$ and group $G_2$. Transmission time zero was selected for illustration. If the pulse is transmitted at a given time $\tau_{G1}$ in the local time of G1, it will instead be received at time $d_{12}+\tau_{G1}$ in the local time of $G_2$. The synchronization error $d_{12}$ can then readily be derived by subtracting $\tau_{G1}$ from this reception time.

Figure 7:
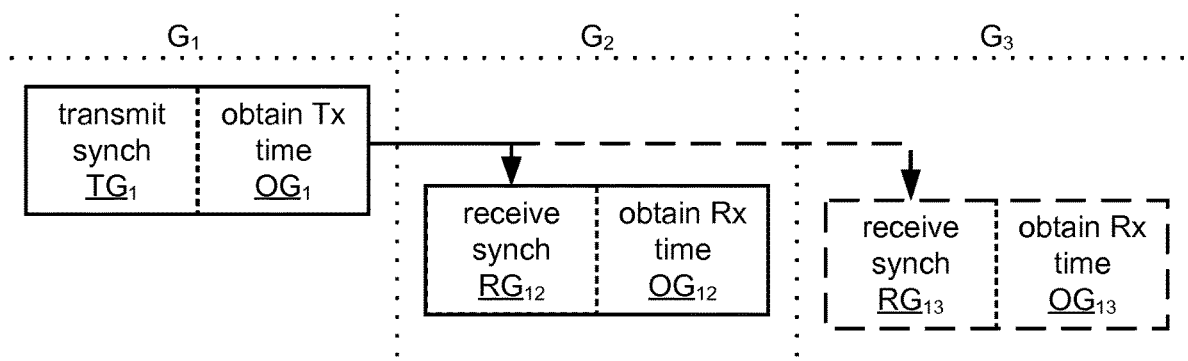

FIG. 7 illustrates a flow chart for some exemplary embodiments of the inter-group synchronization procedure between the group $G_1$ and the group $G_2$. The same flowchart can be generalized to a inter-group synchronization procedure between two arbitrary groups $G_i$ and $G_j$ by simply replacing the index 1 with i and the index 2 with j. The inter-group synchronization procedure illustrated in FIG. 7 comprises transmitting, in step $TG_1$, from the first group $G_1$, a synchronization signal.

obtaining, in step $OG_1$, a transmission time indicator indicating a transmission time of that synchronization signal in the local time of the first group $G_1$.

receiving, in step $RG_{12}$, by the second group $G_2$, the synchronization signal.

obtaining, in step $OG_{12}$, a reception time indicator indicating a reception time, in the local time of the second group $G_2$, when the synchronization signal was received by the second group $G_2$.

The transmission time indicator obtained in step $OG_1$ and the reception time indicator obtained in step $OG_2$ can be used as a basis for obtaining a timing adjustment parameter for counteracting time differences between the local times of the group $G_1$ and the group $G_2$. The timing adjustment parameter can be a number indicating said time difference, expressed in a suitable unit. It may, for instance, be the synchronization error $d_{12}$ mentioned above. This timing adjustment parameter can be used in step 240, in combination with the timing adjustment parameters from the intra-group synchronization in step 210, to control the mutual timing of the transmissions from the individual access points to facilitate coherent transmissions.

The inter-group synchronization procedure can be extended to N≥3 groups $G_1$-$G_N$ in several different ways. According to an exemplary embodiment, group $G_2$ is first synchronized with group $G_1$ as above. Then, group $G_3$ can be synchronized with group $G_2$ in the same way. After that, group $G_4$ can be synchronized with group $G_3$ in the same way, etc. According to another exemplary embodiment, each of a plurality of groups $G_j$, j=2, . . . , N, can receive, in a step $R_{1j}$ the synchronization signal transmitted from group $G_1$ in step $TG_1$ and can obtain, in a step $OG_{1j}$, a reception time indicator indicating a reception time, in the local time of that group $G_j$, when the synchronization signal was received by that group $G_j$. An example of this is illustrated in FIG. 7 for N=3, where it is indicated that the flowchart may also include steps $RG_{13}$ and $OG_{13}$. In this way, all the groups $G_j$, j=2, . . . , N, can be synchronized with the group $G_1$, and thus also with each other.

In the above description, a simplification has been made, which is that a synchronization signal sent from one access point is received by the other access points at the same time as it is transmitted. In practice, the synchronization signal propagates with a finite speed (the speed of light) from the transmitting access point to the receiving access points. Hence, there is a nonzero propagation delay in the air for the synchronization signal. In theory, it would be possible to compensate for these propagation delays when performing the synchronization, provided that the propagation delays, or equivalently the propagation distances, between the access points were known. However, contrary to a conventional MIMO system, where the antenna elements are arranged in a neat array with well-defined distances between the antenna elements, such knowledge cannot generally be assumed to be available. Thus, in some exemplary embodiments, where the propagation delays are unknown, there can be some small residual synchronization errors caused by these unknown propagation delays. However, it should be noted that these synchronization errors can be so small that they do not, in practice, negatively influence the possibility to obtain phase-coherent transmissions. Such small synchronization errors can result in phase shifts in the estimated channels $g_{k,m}$ (compared with the estimated channels that would have been obtained with a perfectly synchronized distributed MIMO system). The application of conjugate beamforming, based on these estimated channels $g_{k,m}$, automatically compensates for the small synchronization errors and results in overall phase-coherent transmissions from the distributed MIMO system to the wireless communication devices $u_1, \ldots, u_N$.

According to some exemplary embodiments, the distributed MIMO system can comprise a control circuit configured to control the MIMO system to perform the method disclosed herein. The control circuit can be or be comprised in the central unit 100. Alternatively, the control circuit can be distributed within the distributed MIMO system, e.g. partly residing within the central unit 100 and partly within the access points $A_1$-$A_K$, such as within the DSP circuits 170 within one or more of the access points $A_1$-$AP_K$. Below, reference is made to the control circuit with reference number 310.

Figure 8:
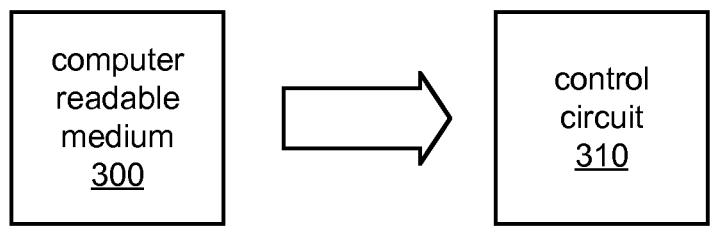
FIG. 8 illustrates an exemplary computer-readable medium and a control circuit according to exemplary embodiments of the present disclosure.

In some exemplary embodiments, the control circuit 310 can be implemented as a dedicated application-specific hardware unit. Alternatively, said control circuit 310, or parts thereof, can be implemented with programmable and/or configurable hardware units, such as but not limited to one or more field-programmable gate arrays (FPGAs), processors, or microcontrollers. Thus, the control circuit 310 can be a programmable control circuit 310. Hence, embodiments of the present disclosure can be embedded in a computer program product, which enables implementation of the method and functions described herein. Therefore, according to embodiments of the present disclosure, there is provided a computer program product comprising computer program code that configures the control circuit 310 to perform any of the functions or method embodiments herein when said computer program code is executed by the programmable control circuit 310. When the program code is executed by the control circuit 310, the control circuit 310 can perform the method steps or functions directly, the control circuit 310 can cause other circuits or units to perform the method steps or functions, or a combination thereof. The computer program product can be stored on a computer-readable medium, such as a non-transitory computer-readable medium 300, as illustrated in FIG. 8, from which the program code can be loaded and executed by said programmable control circuit 310.

The disclosure above refers to specific embodiments. However, other exemplary embodiments than the above described are possible within the scope of the disclosure. Different method steps than those described above, performing the method by hardware or software, can be provided within the scope of the disclosure. The different features and steps of the embodiments can be combined in other combinations than those described.

It should be emphasized that the term "comprise/comprising", when used in this disclosure, is taken to specify the presence of stated features, integers, steps, or components, but does not preclude the presence or addition of one or more other features, integers, steps, components, or groups thereof.

The invention claimed is:

1. A method of operating a distributed multiple input multiple output (MIMO) system, wherein the distributed MIMO system is configured to serve one or more wireless communication devices and comprises a plurality of access points comprising respective time circuits configured to keep track of respective local times of the respective access points, wherein the method comprises:

performing an intra-group synchronization procedure for a first group of at least three of the access points, wherein the at least three access points of the first group do not have access to a centralized time reference, said intra-group synchronization procedure comprising, for each particular access point in the first group:
transmitting, from the particular access point, a synchronization signal;
obtaining a transmission time indicator indicating a transmission time of the synchronization signal in the local time of the particular access point;
receiving, by each of the other access points in the first group, the synchronization signal; and
obtaining reception time indicators indicating respective reception times, in the local times of the other access points of the first group, of when the synchronization signal was received by the other access points in the first group.

2. The method of claim 1, wherein the intra-group synchronization procedure for the first group further comprises:
obtaining, based on the obtained transmission time indicators and reception time indicators, timing adjustment parameters for counteracting time differences between the local times of the access points in the first group.

3. The method of claim 2, comprising transmitting, from the plurality of the access points, a signal to a wireless communication device served by the distributed MIMO system.

4. The method of claim 2, wherein respective timings of the signal transmissions from the respective access points are controlled based on the obtained timing adjustment parameters.

5. The method of claim 1, further comprising performing the intra-group synchronization procedure for at least a second group of at least three access points that are not included in the first group, wherein the at least three access points of the second group do not have access to a centralized time reference.

6. The method of claim 5, further comprising performing an inter-group synchronization procedure for at least the first and second groups.

7. The method of claim 6, wherein the inter-group synchronization procedure comprises:
transmitting, from the first group, a synchronization signal;
obtaining a further transmission time indicator indicating a transmission time of the synchronization signal in a local time of the first group;
receiving, by the second group, the synchronization signal; and
obtaining a further reception time indicator indicating a reception time, in a local time of the second group, of when the synchronization signal was received by the second group.

8. The method of claim 7, wherein the inter-group synchronization procedure further comprises:
obtaining, based on the obtained further transmission time indicator and further reception time indicator, a further timing adjustment parameter for counteracting time differences between the local times of the first group and the second group.

9. The method of claim 8, comprising transmitting, from the plurality of the access points, a signal to a wireless communication device served by the distributed MIMO system.

10. The method of claim 9, wherein respective timings of the signal transmissions from the respective access points are controlled based on the obtained timing adjustment parameters and further timing adjustment parameter.

11. A distributed multiple input multiple output (MIMO) system comprising:
a plurality of access points comprising respective time circuits configured to keep track of respective local times of the respective access points; and
a control circuit configured to control the MIMO system according to operations corresponding to the method of claim 1.

12. A non-transitory, computer-readable medium storing computer program code that, when executed by a programmable control circuit of a distributed multiple input multiple output (MIMO) system, configure the distributed MIMO system to perform operations corresponding to the method of claim 1.

* * * * *